United States Patent Office 2,755,319
Patented July 17, 1956

2,755,319

PREPARATION OF METHYLACETYLENE

Durward A. Baggett, Angleton, Tex., assignor to The Dow Chemical Company, Midland, Mich., a corporation of Delaware No Drawing. Application January 26, 1953,
Serial No. 333,335

5 Claims. (Cl. 260—678)

This invention relates to a process for the preparation of methylacetylene by the reaction of 1,2-dichloropropane with an alkali metal hydroxide.

The general reaction between an alkali metal hydroxide and a haloaliphatic hydrocarbon to split off hydrogen halide and form the corresponding unsaturated compound is well known. When 1,2-dichloropropane is reacted with an alkali metal hydroxide according to the teachings of the art, monochloropropenes are preponderantly produced together with minor amounts of propadiene and methylacetylene. Due to the closeness of their boiling points, it has not been commercially feasible to separate the small quantities of propadiene and methylacetylene so obtained.

It is an object of the present invention to prepare methylacetylene from 1,2-dichloropropane in good yield with a minimum yield of propadiene and monochloropropenes. Other objects and advantages will be apparent from the following description.

According to the process of the present invention, 1,2-dichloropropane is reacted with an aqueous solution of an alkali metal hydroxide, especially sodium hydroxide, at a temperature in the range of about 150° to 175° C. and at a pressure above 250 pounds per square inch gauge. Quite surprisingly, methylacetylene is produced in good yields to the virtual exclusion of propadiene, e. g. in a mole ratio of about 9:1.

The reactants should contain no more than trace amounts of oxygen, e. g. air, and metallic contaminants such as copper, zinc, and iron which may depress or even completely inhibit the formation of methylacetylene and propadiene. For best results, the reactants should contain less than 5 parts per million zinc, 0.35 part per million iron, and 0.02 part per million copper, either free or combined. Air should also be removed from the reaction vessel before charging it with the reactants. This may be accomplished by purging the vessel with an inert gas, such as nitrogen, or a gas which is inert under the conditions of the reaction, e. g. methane. As a precautionary measure methane may be bubbled through the reactants to remove oxygen dissolved therein prior to the reaction.

Two moles of sodium hydroxide are theoretically required to completely dehydrochlorinate one mole of 1,2-dichloropropane to methylacetylene, the overall equation for the reaction being written as follows:

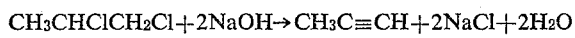

Although somewhat greater than one molecular proportion of aqueous sodium hydroxide may be employed per molecular proportion of 1,2-dichloropropane in the instant process, approximately two or more moles of sodium hydroxide are generally required to give good conversions to the desired end-product, methylacetylene. The concentration of aqueous sodium hydroxide is not too critical, but should be sufficiently dilute to prevent precipitation of sodium chloride in the reaction vessel. Very satisfactory results have been obtained employing aqueous sodium hydroxide of from 14 to 23 percent strength.

The pressure employed throughout the reaction should be sufficiently great to maintain the initial reactants in the liquid phase at the temperature of the reaction. A sufficiently high pressure is usually employed to maintain not only 1,2-dichloropropane in the liquid phase, but also any chloropropenes formed during the reaction, e. g. 2-chloropropene-1 and cis and trans 1-chloropropene-1. For this purpose, superatmospheric pressures above approximately 250 p. s. i. g. at 150° C. and 350 p. s. i. g. at 175° C. should be employed. The reaction is preferably carried out under pressures somewhat greater than about 450 p. s. i. g. at 150° C. and about 600 p. s. i. g. at 175° C. Pressures above 850 p. s. i. g. are not ordinarily employed.

The optimum contact time, e. g. residence time in the reactor, varies inversely with the temperature, pressure, and degree of mixing, and is regulated to give high conversions and yields of methylacetylene. Good mixing is essential for best results. An overall residence time in the reactor of from 17 to 42 minutes is ordinarily satisfactory for the instant process although longer or shorter contact times may sometimes be used. Prolonged residence in the reactor beyond optimum contact times gives rise to undesirably large quantities of tar and other decomposition products. It is therefore more desirable to recycle the unconverted 1,2-dichloropropane and any 1-chloropropene-1 to the reaction vessel rather than increase the initial contact time.

The following example illustrates the process of the invention, but is not to be construed as limitative.

EXAMPLE

Methylacetylene was prepared in a continuous manner according to the process of the invention as hereinafter described. Aqueous sodium hydroxide of approximately 18 percent concentration and 1,2-dichloropropane were employed in the reaction. These reactants contained no more than trace amounts of gaseous oxygen and metallic contaminants such as copper, zinc, and iron. By analysis, the 1,2-dichloropropane was found to contain the following metals in parts per million: 0.16 p. p. m. Fe, <0.01 p. p. m. Cu, <0.1 p. p. m. Zn. The reactants were preheated separately to 100° C. and then passed under a pressure of about 470 p. s. i. g. into the bottom of a heated pot-type stainless steel reactor having a capacity of about 1.35 gallons. The aqueous sodium hydroxide was fed at a rate of 3.21 gallons per hour (70.9 gram moles NaOH) and 1,2-dichloropropane at 0.842 gallon per hour (32.7 gram moles). The mole ratio of NaOH to

represented by these feed rates is approximately 2.16 to 1. In the reactor, the reactants were thoroughly mixed by means of a motor-driven stirrer and the resulting mixture was heated to a temperature of about 150° C. Residence time in the reactor was approximately 18 minutes. Product gases, mainly methylacetylene, collected at the top of the reaction vessel. The reacted liquid mixture and product gases were continuously withdrawn from the side of the reactor near its top at a rate such as to maintain the liquid level and the gas pressure in the reactor substantially constant. The total effluent was first cooled to approximately 25° C. by passing it through a water-jacketed condenser and thereafter introduced into a steam stripper column. Here the aqueous sodium hydroxide and sodium chloride were separated from the remainder of the product which was taken off overhead. The stripper column overhead was then cooled in condensers to approximately 15° C. whereupon those constituents boiling above 15° C. were liquefied and separated from the normally gaseous components boiling below this temperature. Upon standing, the liquid portion separated into an aqueous and an oil layer. A small amount of acetone was present in the water layer. The oil layer was analyzed for percent composition by infra-red analysis and found to contain chiefly trans 1-chloropropene-1 and unconverted 1,2-dichloropropane. The gaseous portion was subsequently condensed and then fractionally distilled on a low temperature Podbielniak column. The chief constituents of these low temperature fractions as determined by mass spectrometer, infra-red, and Orsat analyses were methylacetylene and propadiene present in a mole ratio of approximately 9 to 1. Of the 1,2-dichloropropane fed, approximately 59.6 mole percent was reacted. The accompanying table contains the data for the run.

Another run was carried out in accord with the process of the invention and under conditions very similar to those described above except that the temperature and the pressure were increased to 175° C. and 600 p. s. i. g. respectively. Product analysis and other pertinent data for this run are contained in the following table.

A third run was carried out at a temperature of 222° C., not according to the process of the present invention. A large excess of aqueous sodium hydroxide was employed in the reaction which was conducted at a pressure of 600 p. s. i. g. Aqueous sodium hydroxide reacted with 81.8 mole per cent of the 1,2-dichloropropane fed. The data for the run may be found in the table below.

*Reaction of 1,2-dichloropropane and aqueous sodium hydroxide*

| Temperature | 150° C. | 175° C. | 222° C. |
|---|---|---|---|
| Pressure _____ p. s. i. g__ | 470 | 600 | 790 |
| Contact time _____ minutes__ | 18 | 18 | 24 |
| 1, 2-Dichloropropane feed _____ g. moles/hr__ | 32.7 | 42.2 | 7.9 |
| Sodium hydroxide feed (18% aqueous soln.) g. moles/hr__ | 70.9 | 75.5 | 65.0 |
| Mole ratio sodium hydroxide to 1, 2-dichloropropane | 2.17 | 1.79 | 8.24 |
| Recovered Product:[1] | | | |
| Methylacetylene _____ mole percent__ | 40.5 | 49.4 | 16.0 |
| Propadiene _____ do____ | 4.3 | 5.0 | 10.1 |
| Trans-1-chloropropene-1 __ do____ | 45.0 | 38.2 | |
| 2 Chloropropene 1 _____ do____ | 6.9 | 5.6 | 73.1 |
| Acetone _____ do____ | 0.6 | | 0.6 |
| $CH_4, C_2H_2, H_2$, etc _____ do____ | 2.7 | 1.8 | |

[1] Exclusive of 1, 2 dichloropropane.

As will be seen from the table, a high proportion of methylacetylene to propadiene was obtained in each run conducted in accord with the instant process e. g. at 150° C. and 175° C. This proportion was many times lower for the run at 222° C. not in accord with the invention. In further contrast to the runs carried out at 150° and 175° C. according to the invention, the run at 222° C. preponderantly produced 2-chloropropene-1 rather than methylacetylene. The compound 2-chloropropene-1, unlike trans-1-chloropropene-1, cannot be recycled to the reaction vessel and converted preponderantly to methylacetylene.

What is claimed is:

1. A process for the production of methylacetylene which comprises reacting 1,2-dichloropropane with an aqueous solution of a greater than equimolecular proportion of alkali metal hydroxide at a temperature in the range of from about 150° C. to about 175° C. and under a superatmospheric pressure sufficient to maintain the initial reactants liquid, said reactants containing no more than trace amounts of elemental oxygen and of metals of the group consisting of copper, iron, and zinc.

2. A process for the production of methylacetylene which comprises heating a liquid phase mixture of 1,2-dichloropropane and an aqueous solution of greater than two molecular proportions of sodium hydroxide at a temperature in the range of from about 150° C. to about 175° C. and at a superatmospheric pressure sufficiently great to maintain the reactants in the liquid phase, said reactants containing sufficient water to maintain the product sodium chloride in solution but no more than trace amounts of elemental oxygen and of metals of the group consisting of copper, iron, and zinc.

3. A process for the production of methylacetylene which comprises heating a liquid phase mixture of 1,2-dichloropropane and an aqueous solution of greater than two molecular proportions of sodium hydroxide at a temperature in the range of from about 150° C. to about 175° C. and at a superatmospheric pressure in the range of from about 450 to about 850 pounds per square inch gauge, said reactants containing sufficient water to maintain the product sodium chloride in solution but no more than trace amounts of elemental oxygen and of metals of the group consisting of copper, iron, and zinc.

4. A process according to claim 3 wherein aqueous sodium hydroxide of from about 14 to 23 percent strength is employed.

5. A continuous process for the production of methylacetylene which comprises continuously passing into a reaction zone an aqueous solution of sodium hydroxide and of liquid 1,2-dichloropropane in a mole ratio of sodium hydroxide to 1,2-dichloropropane of greater than two, said reactants containing no more than trace amounts of elemental oxygen and of metals of the group consisting of copper, iron, and zinc; thoroughly mixing said reactants and maintaining them admixed in the reaction zone; heating the reactant mixture to maintain a reaction temperature in the reaction zone of from about 150° C. to about 175° C. for a time sufficiently long to form methylacetylene; maintaining a superatmospheric pressure sufficient to keep the reactants liquid while in the reaction zone; continuously removing product mixture containing methylacetylene from the reaction zone; and separating methylacetylene from the product mixture.

References Cited in the file of this patent

UNITED STATES PATENTS

| 1,986,876 | Baxter et al. | Jan. 8, 1935 |
| 2,455,677 | Horeczy | Dec. 7, 1948 |
| 2,478,299 | Miller | Aug. 9, 1949 |
| 2,542,976 | Airs et al. | Feb. 27, 1951 |
| 2,649,485 | Taylor et al. | Aug. 18, 1953 |